(No Model.)  2 Sheets—Sheet 1.

J. WEBB.
GLASSWARE AND METHOD OF MANUFACTURING THE SAME.

No. 379,089. Patented Mar. 6, 1888.

WITNESSES:

INVENTOR.
Joseph Webb
BY Connolly Bros.
ATTORNEYS.

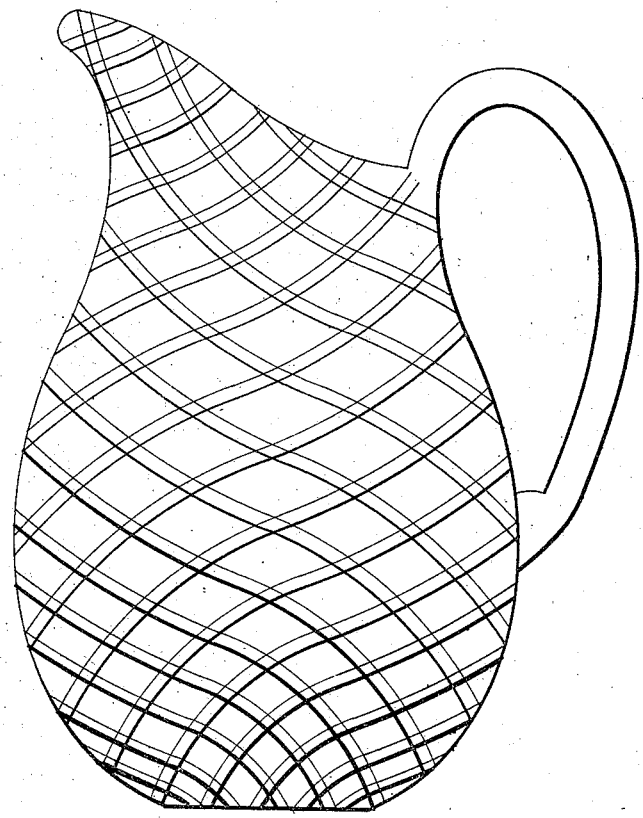

UNITED STATES PATENT OFFICE.

JOSEPH WEBB, OF PHILLIPSBURG, BEAVER COUNTY, PENNSYLVANIA.

GLASSWARE AND METHOD OF MANUFACTURING THE SAME.

SPECIFICATION forming part of Letters Patent No. 379,089, dated March 6, 1888.

Application filed June 18, 1887. Serial No. 241,811. (No model.)

*To all whom it may concern:*

Be it known that I, JOSEPH WEBB, a subject of the Queen of Great Britain, residing at Phillipsburg, in the county of Beaver and State of Pennsylvania, have invented certain new and useful Improvements in Glassware and Methods of Manufacturing the Same; and I do hereby declare the following to be a full, clear, and exact description of the invention, reference being had to the accompanying drawings, which form part of this specification.

This invention has relation to articles of glassware and methods of manufacturing the same, and has for its object the production of new and strikingly beautiful articles of glassware.

One of the most popular and beautiful styles of glassware now on the market is that known as "pearl" ware, such ware consisting of two shells or films of glass welded together on lines crossing one another, leaving air-bubbles or cavities between, the outer shell or film being acid-roughed or etched, and the general effect being an imitation of the iridescent colors seen in mother-of-pearl.

My invention relates particularly to the class of glassware known as "pearl" ware; and it consists, first, in the novel method of manufacture hereinafter described and claimed, and in the new article produced by the process or method of manufacture.

Figure 1:
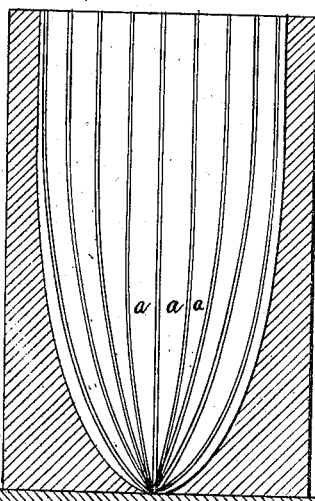
Figure 2:
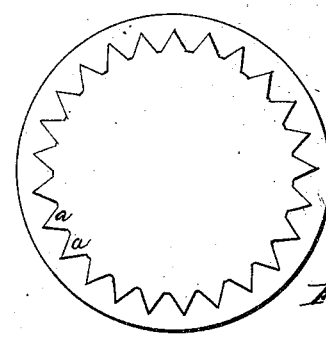
Figure 3:
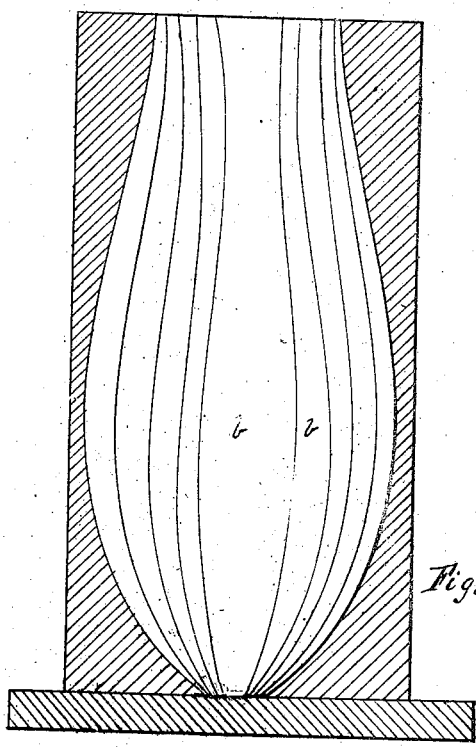
Figure 4:
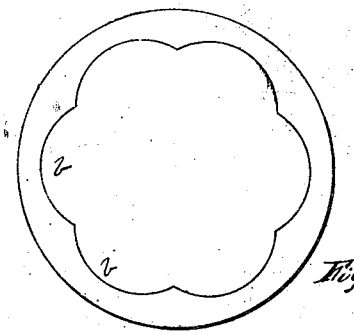

In the accompanying drawings I have illustrated several molds employed in carrying my invention into effect and a completed article of manufacture made according to my invention, and in the said drawings Figure 1 is a vertical sectional view of a glass-mold used in the first step in the method of manufacture; Fig. 2, a horizontal sectional view of the same; Fig. 3, another mold, also used in the process of manufacture; Fig. 4, a horizontal sectional view of the mold shown in Fig. 3, and Fig. 5 an elevation of an article of glass made according to my invention.

The mold shown in Figs. 1 and 2 is, it will be observed, an ordinary "rib" mold—that is, a mold having cut upon its inner surface a number of narrow vertical equidistant grooves, *a a a*, which form ribs or ridges upon an article blown in said mold, while the mold shown in Figs. 3 and 4 has its interior surface formed with a number of wide semicircular grooves *b b*, which form what is known in the trade as "melon" ridges or corrugations upon the outside of an article blown in said mold.

In carrying my invention into effect I proceed as follows: I gather a lump of glass upon the end of a blow-pipe, insert the same in the mold A, and blow it in the usual manner. This lump may be white, opaque, or transparent glass, and after it is blown, as described, forms what will be hereinafter called the "core." I then place the core so formed within a cup of glass, which may be sensitive glass or colored transparent glass or shaded glass, and weld the cup and core together—that is, I weld the raised ridges upon the core to the inner surface of the cup, leaving spaces between the ridges. I then, while the glass is sufficiently hot to work, twist the cup and the core, so that the ridges and the air-spaces between the ridges, instead of being straight, as when the core and cup are first put together, are spiral in form. I then blow the adherent cup and core, with the inclosed spiral air-spaces, in the mold B, and thus form melon ridges upon the outside of the article, and at the same time cause the inner surface of the cup to adhere to the outside surface of the core upon vertical lines intersecting the spiral air-spaces, and thereby divide such air-spaces into diamond-shaped cavities. After blowing the article, I then by proper manipulation form it to the desired shape, and finally finish it by making the outer surface lusterless, as by acid etching or other suitable process, so as to produce the peculiar and beautiful pearly effect.

The precise form of molds herein described and shown need not necessarily be employed; but some substantially-equivalent form may be substituted, so as to vary the appearance of the article somewhat from that shown.

I claim—

1. The method of manufacturing glassware, consisting in blowing a core in a mold having vertical grooves and thereby forming ribs upon said core, then inclosing said core in a cup and welding the two together, leaving air-spaces between the core and cup, then twisting the core and cup, then blowing the two adherent shells in a mold having ribs, whereby they are brought into contact on lines intersecting the ribs on the core, substantially as described.

2. The method of manufacturing glassware, consisting in blowing a core in a mold having vertical grooves and thereby forming ribs upon said core, then inclosing said core in a cup and welding the two together, leaving air-spaces between the core and cup, then twisting the core and cup, then blowing the two adherent shells in a mold having ribs, whereby they are brought into contact on lines intersecting the ribs on the core, then forming the article to shape, and, finally, roughening or aciding the surface, substantially as described.

3. As a new manufacture, an article of glassware consisting of two adherent shells or films with air-spaces between them, formed by spiral or curved adherent lines intersected by vertical adherent lines, and said article having a roughened or lusterless surface, substantially as described.

4. As a new article of manufacture, glassware consisting of two shells or films having interjacent air-spaces or cavities formed by spiral ribs upon the core, intersected by depressed vertical lines or grooves formed upon the outer film, substantially as described.

In testimony that I claim the foregoing I have hereunto set my hand.

JOSEPH WEBB.

Witnesses:
  WINFIELD S. MOORE,
  ALFRED S. MOORE.